US008701852B2

(12) United States Patent
Boyer

(10) Patent No.: US 8,701,852 B2
(45) Date of Patent: Apr. 22, 2014

(54) VISCOUS FAN DRIVE SYSTEMS HAVING FILL AND SCAVENGE CONTROL

(75) Inventor: Rick L. Boyer, Marshall, MI (US)

(73) Assignee: Borg Warner Inc., Auburn Hills, MI (US)

(*) Notice: Subject to any disclaimer, the term of this patent is extended or adjusted under 35 U.S.C. 154(b) by 753 days.

(21) Appl. No.: 12/306,001

(22) PCT Filed: Jul. 5, 2007

(86) PCT No.: PCT/US2007/015606
§ 371 (c)(1),
(2), (4) Date: Oct. 17, 2009

(87) PCT Pub. No.: WO2008/008287
PCT Pub. Date: Jan. 17, 2008

(65) Prior Publication Data
US 2010/0044602 A1    Feb. 25, 2010

Related U.S. Application Data

(60) Provisional application No. 60/806,804, filed on Jul. 10, 2006.

(51) Int. Cl.
*F16D 35/02* (2006.01)
(52) U.S. Cl.
USPC ............. 192/58.61; 192/58.7; 192/58.8
(58) Field of Classification Search
USPC ............. 192/58.61, 58.62, 58.7, 58.8
See application file for complete search history.

(56) References Cited

U.S. PATENT DOCUMENTS

| 3,893,555 | A | | 7/1975 | Elmer | |
|---|---|---|---|---|---|
| 4,046,239 | A | * | 9/1977 | Tinholt | 192/58.7 |
| 4,051,936 | A | * | 10/1977 | Crisenbery et al. | 192/58.8 |
| 4,086,990 | A | * | 5/1978 | Spence | 192/58.7 |
| 4,116,318 | A | * | 9/1978 | Crisenbery et al. | 192/58.7 |
| 4,351,425 | A | | 9/1982 | Bopp | |
| 4,544,053 | A | * | 10/1985 | Yamaguchi et al. | 192/58.62 |
| 4,591,037 | A | | 5/1986 | Bopp | |
| 4,741,421 | A | * | 5/1988 | Johnston | 192/58.7 |
| 5,152,383 | A | * | 10/1992 | Boyer et al. | 192/58.61 |
| 5,701,985 | A | * | 12/1997 | Martin | 192/58.8 |
| 6,032,775 | A | * | 3/2000 | Martin | 192/58.61 |
| 2005/0196297 | A1 | | 9/2005 | Baumgartner et al. | |

* cited by examiner

*Primary Examiner* — Rodney Bonck

(57) ABSTRACT

An engagement system (10) for a fluid-coupling device (9) may include a first engagement member (31) and a second engagement member (15) that is in operation with the first engagement member (31). A working chamber (33) is disposed between and at least partially defined by the first engagement member (31) and the second engagement member (15). The working chamber (33) has an inlet port (118) and an outlet port (120). A fluid reservoir (35) is fluidically-coupled to the working chamber (33). A scavenge valve (11) is coupled between the working chamber (33) and the fluid reservoir (35) and adjusts the fluid flow through the outlet port (120). An engagement system (10) for a fluid-coupling device (9) may in addition to or alternatively include a working chamber (33) that includes a working chamber inlet port (118) that is along an outer perimeter (126) of the first engagement member (31). A valve (11) is coupled between the working chamber (33) and the fluid reservoir (35) and adjusts the fluid flow through the working chamber.

23 Claims, 5 Drawing Sheets

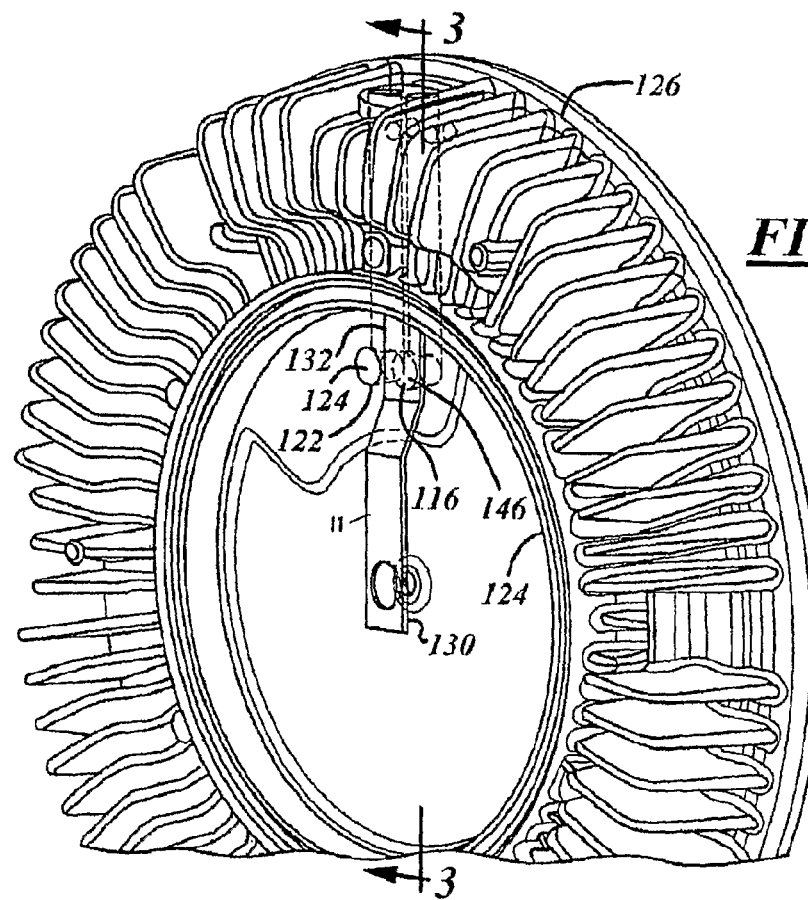
FIG. 2
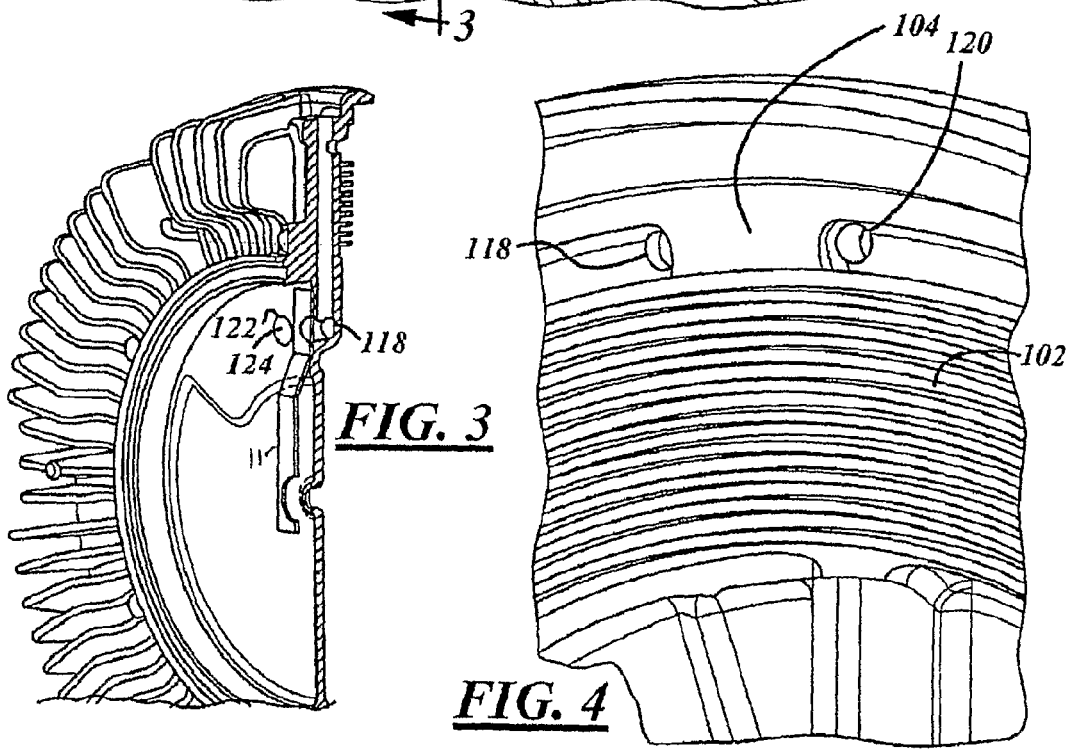
FIG. 3
FIG. 4

VISCOUS FAN DRIVE SYSTEMS HAVING FILL AND SCAVENGE CONTROL

CROSS-REFERENCE TO RELATED APPLICATIONS

This application claims the benefit of U.S. Provisional Application No. 60/806,804 filed in the United States Patent Office on Jul. 10, 2006.

TECHNICAL FIELD

The invention relates generally to fan drive systems. More specifically, the present invention relates to viscous fan drives and operational engagement and disengagement control techniques associated therewith.

BACKGROUND ART

The present invention relates to fluid-coupling devices of the type that include both a fluid operating chamber and a fluid reservoir chamber. The fluid-coupling devices often have valving, which controls the quantity of fluid entering and exiting the operating chambers thereof. The devices may be electronically or mechanically controlled.

Although the present invention may be used advantageously in fluid-coupling devices having various configurations and applications, it is especially advantageous in a coupling device of the type used to drive a radiator cooling fan of an internal combustion engine, and will be described in connection therewith.

Fluid-coupling devices ("fan drives") of the viscous shear type have been popular for many years for driving engine cooling fans, primarily because their use results in substantial saving of engine horsepower. The fluid-coupling devices typically operate in an engaged, relatively higher speed condition, only when cooling is needed. The fluid-coupling devices operate in a disengaged, relatively lower speed condition, when little or no cooling is required. Today, electrically actuated viscous fan drives are commonplace because they can be precisely controlled between engaged, partially engaged, and disengaged modes to control output at a given fan speed as determined by the vehicle's engine computer.

Controllable viscous fan drives, which are electrical or mechanical based, modulate fan drive output speed by controlling the balance of "fill" and "scavenge". The term "fill" refers to the amount and rate of viscous fluid entering the working chamber from the fluid reservoir. The term "scavenge" refers to the amount and rate of fluid reentering the fluid reservoir from the working chamber. To control this balance, a rotary or axial type valve arm is utilized to vary the restriction of viscous fluid flow entering the working chamber by uncovering or covering one or more fill ports in the fluid reservoir. This control is often based upon engine operating parameters.

Some of the primary factors that control the fan drive at a steady state output speed are the working chamber geometry, the fluid viscosity, and the fluid volume or amount of fluid in the working chamber. The working chamber geometry is fixed by design and the fluid viscosity is fixed at steady state speeds. Thus, the output speed is dependent on the fluid volume. To increase output speed, the fill rate is increased to exceed the scavenge rate and to decrease output speed the opposite occurs.

Since the engagement of the fan drive is dependent upon the amount of viscous fluid entering the operating chamber through the fill port(s) at a given input speed and valve arm position, modulation robustness of the fan drive is inherently limited because the fan drive lacks active control over the rate in which viscous fluid exits the fluid operating chamber. Consequently, fan drive engagement, disengagement, and pumpout performance, especially at low input speeds, is adversely affected.

Thus, there exists a need for an improved viscous fan drive system and associated control technique that overcomes the drawbacks and limitations associated with prior systems.

SUMMARY OF THE INVENTION

The present invention is an improvement over known fan drives and minimizes or overcomes their disadvantages.

One embodiment of the present invention provides an engagement system for a fluid-coupling device that includes a first engagement member and a second engagement member that is in operation with the first engagement member. A working chamber is disposed between and at least partially defined by the first engagement member and the second engagement member. The working chamber has an inlet port and an outlet port. A fluid reservoir is fluidically-coupled to the working chamber. A scavenge valve is coupled between the working chamber and the fluid reservoir and adjusts the fluid flow through the outlet port.

Another embodiment of the present invention, provides an engagement system for a fluid-coupling device that includes a first engagement member and a second engagement member that is in operation with the first engagement member. A working chamber is disposed between and is at least partially defined by the first engagement member and the second engagement member. The working chamber includes a working chamber inlet port along an outer perimeter of the first engagement member. A fluid reservoir is fluidically-coupled to the working chamber. A valve is coupled between the working chamber and the fluid reservoir and adjusts the fluid flow through the working chamber inlet port.

The embodiments of the present invention provide several advantages. One such advantage is the incorporation of a mechanism for directly controlling the flow of fluid exiting a working chamber of a fluid-coupling device. This provides for efficient pump out while allowing for desired control of the fill rate.

Another advantage provided by another embodiment of the present invention is outer perimeter filling and scavenge of a working chamber of a fluid-coupling device. This provides quicker fill and faster pumpout of fluid from the working chamber.

The above stated advantages provide modulation robustness and shorter response time, or in other words, quicker engagement and disengagement control of a fluid-coupling device. This modulation is especially advantageous at low input member speeds.

The present invention also provides an option for a failsafe quite-start and non-failsafe configurations for the above-mentioned engagement control.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 2 is a perspective view of the actuator side of the cover member and a dual-purpose valve arm of the fluid-coupling device of FIG. 1;

FIG. 3 is a perspective sectional view of the cover member and valve arm of FIG. 2 taken along section line 3-3;

FIG. 4 is a close-up perspective view of the working chamber side of the cover member and associated fill and scavenge ports of the assembly of FIG. 2;

DETAILED DESCRIPTION

Figure 1:
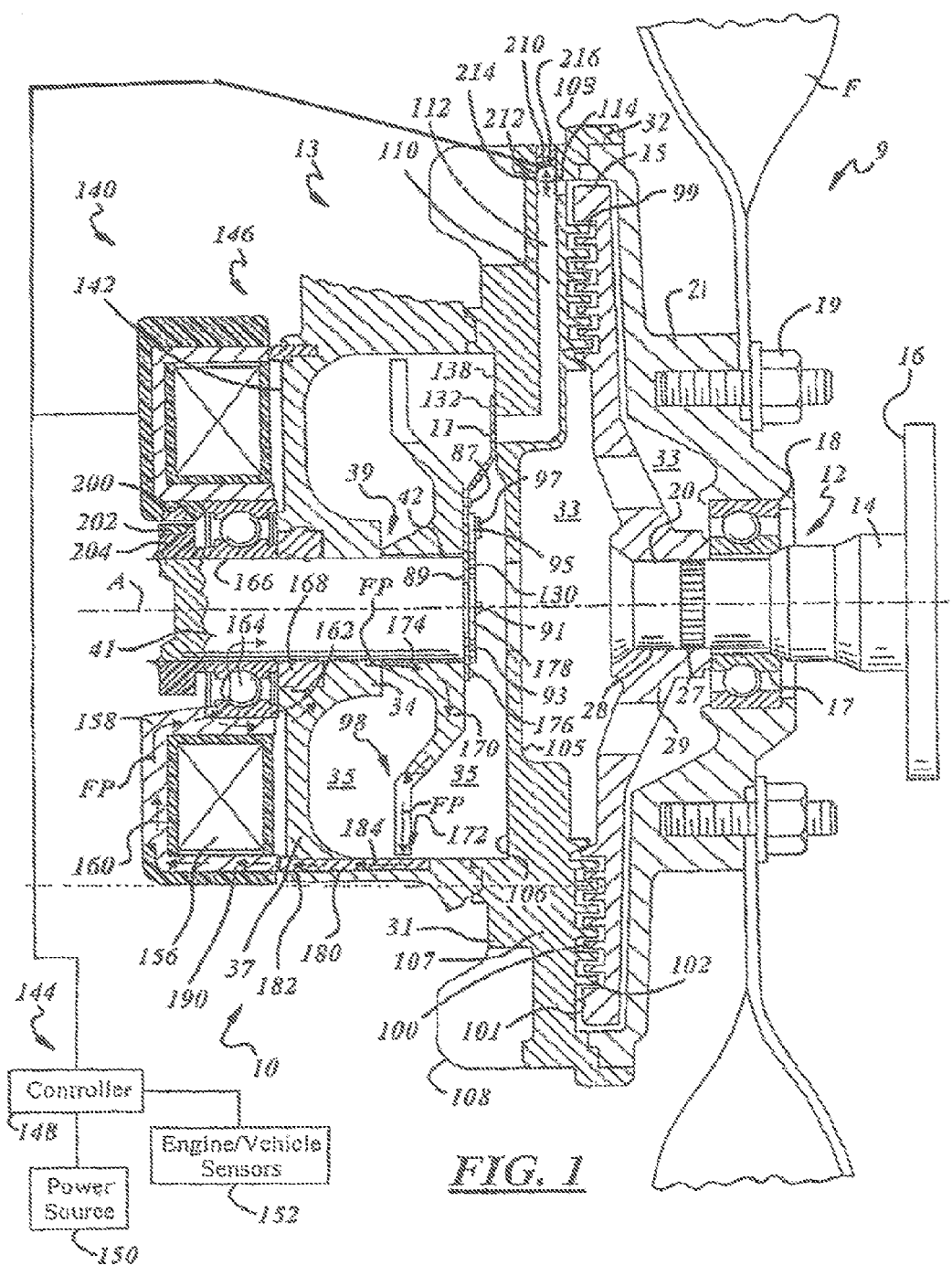
FIG. 1 is an axial cross-section view of a viscous fluid-coupling device incorporating a dual-purpose valve in accordance with an embodiment of the present invention.

In the following figures the same reference numerals will be used to refer to the same components. Although the present invention may be used advantageously in clutch devices having various configurations and applications, it is especially advantageous in an electronically and/or mechanically controlled fluid-coupling device of the type used to drive a radiator cooling fan of an internal combustion engine. Although for simplicity the fluid-coupling device of the present invention will be described in connection with a cooling fan, it is to be understood that the invention is not limited to such uses and structures.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring now to FIG. 1, an axial cross-section view of a viscous fluid-coupling device 9 having an engagement system 10 and incorporating a dual-purpose valve 11 is shown in accordance with an embodiment of the present invention. The engagement system 10 includes an input-coupling assembly, generally designated 12, and an output coupling assembly, generally designated 13. The input-coupling assembly 12 is engageable with and provides rotational energy to the output-coupling assembly 13. The fluid-coupling device 9 is adapted to be driven by an engine (not shown) and, in turn, may drive a radiator-cooling fan F. The fan F may be attached to the output-coupling assembly 13 via fasteners 19. It will be understood however, that the use of the present invention is not limited to any particular fluid-coupling device configuration or any particular application thereof.

The input-coupling assembly 12 includes an input shaft 14, which may be, for example, coupled to a crankshaft of an engine (not shown) and to a rotor 15. The rotor 15 is mounted on the input shaft 14 and is rotated within the output-coupling assembly 13. The input shaft 14 is rotatably driven by means of a flange 16, which may be bolted to a mating flange of an engine water pump (not shown). The input shaft 14 functions as a support for the inner race 17 of a bearing set 18, which is seated on the inside diameter of the fan member 21 of the output-coupling assembly 13. The forward end 20 (left end in FIG. 1) of the input shaft 14 has an interference fit between a serrated portion 27 and an opening 28. The opening 28 is defined by a hub portion 29 of the input-coupling assembly 12. As a result, rotation of the input shaft 14 causes rotation of the rotor 15.

The output-coupling assembly 13 includes a housing 30 that has the rear or fan member 21 and the forward or cover member 31. The members 21 and 31 are secured together by a rollover of the outer periphery 32 of the cover member 31 on the fan member 21. The fan member 21 and the cover member 31 cooperate to define a fluid operating or working chamber 33. Thus, it may be seen that the rotor is disposed within the working chamber 33. The cover member 31 defines a forward protruding, annular reservoir-defining portion 37, which is disposed to be generally concentric about an axis of rotation A. The annular portion 37 defines a generally cylindrical shaft support portion 39 and includes the fluid reservoir chamber 35. Rotatably disposed within the shaft support portion 39 is a valve shaft 41 that extends outwardly (to the left in FIG. 1) through the cover member 31. In connection with subsequent description of the present invention, the valve shaft 41 is also referred to as an "armature shaft", for reasons that will become apparent.

Disposed adjacent the rear end 42 (right end in FIG. 1) of the valve shaft 41 and within the fluid reservoir chamber 35 is the dual-purpose valve or valve arm 11. The valve arm 11 may be referred to as a fill valve or a scavenge valve. Movement of the valve arm 11 controls the flow of fluid between the reservoir chamber 35 and the working chamber 33. The rear end 42 includes a reduced diameter portion 89, which forms an arbor for an inner end 91 of a spiral-wire torsion spring 93. The spring 93 biases the valve arm to a default position. The inner end 91 is mechanically grounded to the portion 89 in any suitable manner. The spring 93 includes a radially extending outer end 95, which is seated against a seat member 97 and extends axially therefrom. The seat member 97 includes a tab that may be stamped out of the valve arm 11. The seat member 97 may also be formed by a protrusion from the armature 98 that extends through an opening in the valve arm 11.

The input-coupling assembly 12 is engageable with the output-coupling assembly 13 through the engagement of the rotor 15 to the cover member 31. The rotor 15 includes a forward surface 99 that defines multiple annular lands 100. The adjacent surface 101 of the cover member 31 forms multiple annular lands 102. The lands 100 and 102 are inter-digitated to define therebetween a serpentine-shaped viscous shear space, which may also be referred to hereinafter by the reference numerals 100 and 102. When torque is transmitted from the input shaft 14 to the rotor 15, the result is a shearing of the viscous fluid contained in the shear space 100, 102, resulting in the transmission of torque to the output-coupling assembly 13 and the cooling fan F. The transmission of torque is dependent upon the amount and state of the viscous fluid in the shear space 100, 102.

Referring now also to FIGS. 2-6, perspective, sectional, close-up, and side views of the cover member and the dual-purpose valve arm are shown. The cover member 31 has an inner member 103 that is disc-shaped with a working chamber side or input side 105 and a reservoir side or output side 106. The cover member 31 may be formed of cast aluminum or some other suitable material(s). A dual-purpose wiper member 104 is on the input side 105 and is configured to direct fluid from the working chamber 33 to the fluid reservoir 35, upon being directed outward toward and circulating about a circumferential outer channel 111 of the inner member 103. The wiper 104 along with the rotation of the inner member 103 creates a low-pressure within the outer channel 111 near the working chamber inlet port 118 to draw fluid therein and to the working chamber 33. The wiper 104 also serves as a dam to direct fluid out of the working chamber 33. The wiper 104 may be a single continuous unit, as shown, or may be separated into multiple units. The input side 105 has an engagement portion 107 with the annular lands 102. Axially located proximate the annular lands 102 on the output side 106 are cooling fins 108. Radially extending within the engagement portion 107, in a designated control section 109 of the inner member 103, between the annular lands 102 and the cooling fins 108, is a fill channel 110 and a scavenger channel 112. The fill channel 110 and the scavenge channel 112 provide radial circulation of fluid through the inner member 103. The fill channel 110 and the scavenge channel 112 extend between the fluid reservoir 35 and the working chamber 33. The fill channel 110 has a reservoir outlet port 114 with an associated reservoir output opening 116 and a working chamber inlet port 118. The reservoir outlet port 114 and the working chamber inlet port 118 may be referred to as fill ports. The scavenge channel 112 has a working chamber outlet port 120 and a reservoir inlet port 122 with an associated reservoir input opening 124. The working chamber outlet port 120 and the reservoir inlet port 122 may be referred to as scavenge ports. Fluid in the working chamber 33 is generally at a higher pressure than the fluid within the fluid reservoir 35. Thus, in operation, fluid in the fluid reservoir 35 passes through the fill channel 110 into the working chamber 33 and returns to the fluid reservoir 35 through the scavenge channel 112.

Although a single fill channel and a single scavenge channel are shown, any number of each may be included. Also, the size of the channels may vary. In one embodiment, the scavenge channel 112 is larger in size than the fill channel 110. In another example embodiment, a single fill channel and multiple scavenge channels are utilized. The stated embodiments provide efficient pump out, and since the scavenge channels may be partially or fully closed off, desired fill can be provided.

The reservoir ports 114 and 122 and the working chamber ports 118 and 120 are located proximate or near each other in the designated control section 109. Note that the reservoir ports 114 and 122 are located on or along an inner perimeter 124 of the engagement portion 107 and the working chamber ports 118 and 120 are located on or along an outer perimeter 126 of the engagement portion 107. This increases the flow rate of fluid into the working chamber 33 at lower speeds, which in turn allows for quicker engagement. This also increases the flow rate of the fluid out of the working chamber 33, which in turn allows for quicker disengagement.

The valve arm 11 has a shaft end 130 and a port end 132. As the valve arm 11 is actuated, the port end 132 is positioned fully over, partially over, or away from the reservoir outlet port 114. When the port end 132 fully covers the fluid reservoir outlet port 114 the valve arm 11 is in a "fully disengaged" position. As such, the valve arm 11 prevents an amount of viscous fluid from entering the working chamber 33 from the reservoir chamber 35 to engage the input-coupling assembly 12 to the output-coupling assembly 13. When the port end 132 fully covers the fluid reservoir inlet port 122, the valve arm 11 is in a "fully engaged" position. When fully engaged, viscous fluid is allowed to enter, but is prevented from exiting the operating chamber 33. This provides maximum torque engagement of the output-coupling assembly 13, and hence maximum fan rotation, at a given input-coupling assembly rotational speed. The port end 132 may partially cover the fluid reservoir outlet port 114, the fluid reservoir inlet port 122, or may partially cover both ports simultaneously. This is referred to as "partial engagement". Moreover, the partially engaged condition is such that the valve arm 11 allows an amount of viscous fluid to both enter and exit the operating chamber 33 from and to the reservoir chamber 35 to engage the output-coupling assembly 13. The amount of partial engagement directly relates to the covered amount or size of the openings 116 and 124. The act of engaging, partially engaging, and disengaging may be referred to as modulation or modulating the fluid-coupling device 9. The infinite variability of the partial engagement provides precise control of the fluid-coupling device 9.

Movement of the valve arm 11, as shown, controls the flow of fluid from the reservoir chamber 35 to the working chamber 33 through the reservoir outlet port 114 and the working chamber inlet port 118. Fluid flow to the working chamber 33 is referred to as "fill" and the control and tasks performed in association therewith are referred to as the "fill process". Movement of the valve arm 11 also concurrently controls the flow of fluid from the working chamber 33 to the reservoir chamber 35 through the working chamber outlet port 120 and the reservoir inlet port 122. Fluid flow out of the working chamber 33 and to the reservoir chamber 35 is referred to as "scavenge" and the control and tasks performed in association therewith are referred to as the "scavenge process". Although a single valve arm is shown for controlling both fill and scavenge fluid flow aspects, any number of valve arms or valves may be utilized. Also, although a particular number of fill and scavenge channels and fill and scavenge ports are shown, any number of each may be included.

Referring now primarily to FIG. 1, attached to the cover member 31 is an actuator assembly, generally designated 140, and disposed adjacent a forward surface 142 of the cover member 31. The actuator assembly 140 is provided as an example, and as shown, includes a control circuit 144 and an electromagnetic circuit 146. Another actuator assembly example is provided and described with respect to FIG. 7. The assembly 140 actuates the valve arm 11 in response to the changes in the electrical input signal and has infinite associated position variability. As such the fluid-coupling device 9 has infinite engagement variability.

The function of the actuator assembly 140 is to rotate the valve arm 11 away from its default position. The actuator assembly 140 may be responsive to an electrical input signal transmitted from a remote location at which changes in a predetermined condition are sensed. Changes in the predetermined condition are represented by changes in an electrical signal that is transmitted to the actuator assembly 140. The predetermined condition or conditions being sensed may vary among applications. As one example, the predetermined condition may refer to the temperature of a liquid coolant in a vehicle engine block. However, one skilled in the art, would recognize that there are an infinite number of other conditions that may be sensed, which may relate to vehicle status parameters, engine status parameters, environment related parameters, or other parameters known in the art.

Figure 5:
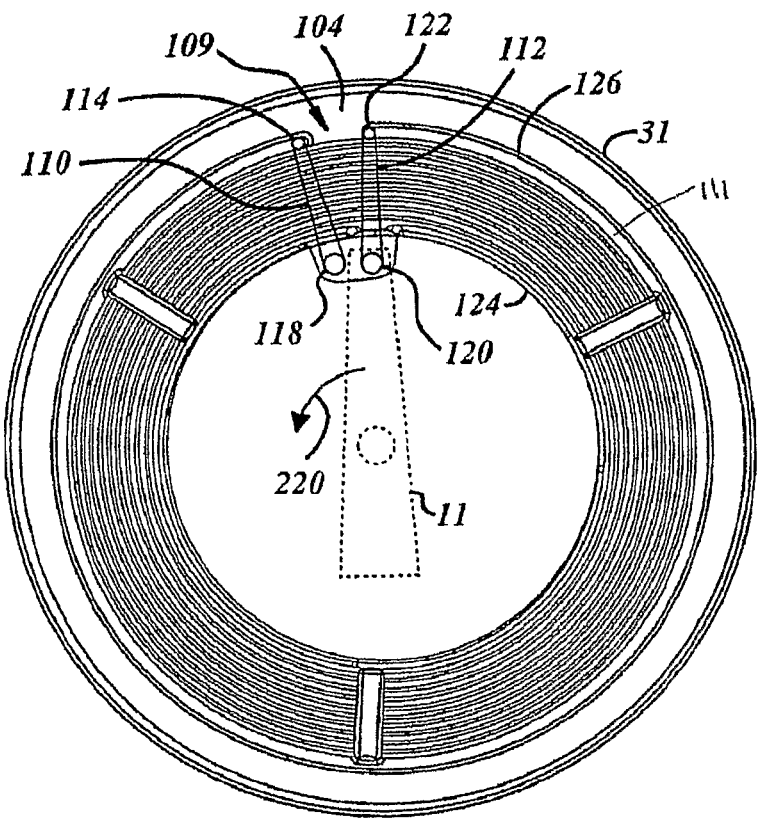
FIG. 5 is a working chamber view of the cover member of FIG. 2 illustrating the valve arm in a no power state and a default or failsafe configuration.

The actuator assembly may bias the valve arm 11 toward a position in which the port end 132 covers the reservoir inlet port 122 and uncovers the reservoir outlet port 114, corresponding to an engaged condition. This engaged biasing is referred to as "failsafe biasing". In the loss of electrical power, fluid is passed to the working chamber 33 to allow, for example, cooling of an engine. However, it should be understood that the present invention is not so limited and, within the scope of the present invention, the valve arm 11 may be biased toward a position to cover the reservoir outlet port 114 and uncover the reservoir inlet port 122. Such a device is referred to as being "non-failsafe" because, in the loss of electrical power, the valve arm 11 is biased toward a disengaged position that prevents fluid from filling the working chamber 33. Failsafe and non-failsafe configurations are shown in FIGS. 5. and 6.

The control circuit 144 includes a controller 148, which is coupled to the electromagnetic circuit 146. The controller 148 receives power from a power source 150 and controls the actuation of the valve arm 11 via the electromagnetic circuit 146. The controller 148 receives electrical signals from sensors 152 regarding engine and vehicle operating conditions. The controller 148 interprets these signals to direct the power source 150 to send electrical current to an electromagnetic coil 156 to control the output from the fluid-coupling device 9 in a manner described in more detail below.

The controller 148 may be microprocessor based such as a computer that has a central processing unit, a memory (RAM and/or ROM), and associated input and output buses. The controller 148 may be application-specific integrated circuits or may be formed of other logic devices and circuits known in the art. The controller 148 may be a portion of a central vehicle main control unit, a control circuit having a power supply, combined into a single integrated controller, located on or off the fluid-coupling device, may be a stand-alone controller, or be a combination of multiple controllers.

The electromagnetic circuit 146, for the embodiment of FIG. 1, has a generally annular ferromagnetic housing member 158 that is mounted proximate to the cover member 31. It may be seen that the housing member 158 is generally C-shaped in axial section, to accommodate therein the electromagnetic coil 156 that is wound on a bobbin 160. The housing member 158 is in engagement with an outer race 162 of a set of ball bearings 164. The bearing set 164 includes an inner race 166 that is disposed about the shaft 41. Disposed to the right of the inner race 166 is an insert 168 that may be cast into the cover member 31. The function of the insert 168 is to provide a hardened surface into which the shaft 41 is press-fit.

Disposed about the rear end 42 is the armature assembly or armature, generally designated 98, which is disposed within the fluid reservoir 35. The armature 98 may be ferromagnetic and formed of a single unitary member and may include a powdered metal part. The armature 98 includes a central hub portion 170, and extending radially therefrom are multiple armature segments 172. Disposed between the shaft 41 and the armature 98 is a non-ferrous or non-conductive bearing surface or bearing sleeve 174. The bearing sleeve 174 may be formed of a low-friction material, such as a bronze or ceramic material.

The valve arm 11 is attached to a transverse surface of the armature assembly 98 by means of a pair of rivets 176, such that the valve arm 11 is fixed to the armature assembly 98, and rotates therewith, in a manner to be described subsequently. The valve arm 11 may include a counterbalancing arm portion and defines a large circular opening 178. The diameter of the opening 178 is at least as large as the diameter of the shaft 41 such that there is no electromagnetic "coupling" between the shaft 41 and the valve arm 11, when the coil 156 is energized.

A flux ring 180 is attached to the cover member and is in flux communication with the armature segments 172. In one embodiment, the flux ring 180 is formed of a ferromagnetic material. The flux ring 180 includes a forward, annular portion 182, which projects slightly forward and axially from the forward surface 142. The flux ring 180 includes pole pieces 184, each of which is formed integrally with the annular portion 182. As an example, there may be eight pole pieces, corresponding to eight armature segments. It should be noted that each of the pole pieces 184 is disposed in at least a partially overlapping relationship with and closely spaced apart from the adjacent armature segments 172 in a radial direction. However, it is not essential that there be an initial overlap of each segment 172 and its respective pole piece 184. Those skilled in the art will appreciate that the gap therebetween is minimized to minimize the electromagnetic reluctance of the resulting flux path (to be described subsequently). It is essential only that each segment 172 and its pole piece be in "operative association" with each other to achieve the desired result. The inner surface of the pole pieces 184 may define the outer boundary of the reservoir chamber 35. In the subject embodiment, upon full energization of the coil 156, the armature assembly 98 may rotate approximately 22° counterclockwise, until there is full overlap between each segment 172 and its respective pole piece 184. Of course the angle of rotation may vary per application. Thus, the desired amount of angular rotation of the valve arm 11 and the armature 98 is a factor in the selection of the number and spacing of the segments and pole pieces.

With the armature 98 and valve arm 11 in the unactuated position, there is a slight overlap of each pole piece 184, relative to its adjacent armature segment 172. The overlap defines a preferred electromagnetic flux path between the flux ring 180 and the armature 98, which also defines the direction of rotation of the armature 98. Therefore, upon energizing the electromagnetic coil 156, the armature 98 rotates counterclockwise. With a circumferential overlap of only several degrees between each pole piece 184 and its adjacent armature segment 180, the electromagnetic reluctance of the flux path is at its maximum. When the coil 156 is energized, the resulting torque on the armature 98 will tend to increase the overlap, thus reducing the reluctance of the flux path. Thus, the amount of current supplied to the coil 156 determines the relative positioning of the valve arm 11, and hence the amount of engagement of the output-coupling assembly 13. At any given moment, for a given input speed, the output speed is proportional to the amount of viscous fluid present in the working chamber 33. The amount of viscous fluid in the working chamber 33 is proportional to the time integral of the difference between the fill rate and the scavenge rate.

The annular housing member 158 also includes an annular portion 190 that surrounds the electromagnetic coil 69 about most of the circumference thereof. The annular portion 190 is disposed in a face-to-face relationship, across a narrow air gap, with the annular flux ring portion 182. Furthermore, the annular portions 182 and 190 have substantially the same radial dimension, to optimize the flux path therebetween.

Upon energizing the coil 156, magnetic flux, represented by flux path FP, causes the armature 98 and the valve arm 11 to rotate from an engaged position toward a position such that the fluid-coupling device is in a partially engaged or fully disengaged condition. As the current to the coil 156 is increased, torque is applied to the armature 98, rotating it against the biasing force of the torsion spring 93. The flux path FP passes through the annular member 158, axially along the shaft 41 through the annular portion 37 and the outer race 162, radially through the hub portion 170 and the armature segments 172, and axially back to the annular member 158 through the flux ring 180. The actuator assembly 140 is generally referred to as a magnetic variable reluctance torque actuator. Electromagnetic torque is produced and may act on the armature 98, as the armature 98 rotates, up to the point at which the overlap between the armature segments 172 and the pole pieces 184 is at a maximum. This is the point wherein the reservoir outlet port 114 is fully covered by the valve arm 11.

A speed sensor 200 may be located at a radially inward portion of the annular housing member 158. The speed sensor 200 may be in the form of a Hall effect sensor, as shown, or may be in some other form known in the art. Disposed about the forward end of the valve shaft 41, firmly retained against the inner race 166, is an annular ring 202. The ring 202 has molded therein a series of circumferentially spaced apart magnetic pole pieces 204. The speed sensor 200 senses the passing pole pieces 204, and transmits a speed signal, indicating the speed of the output-coupling assembly 13. The speed signal is transmitted to the controller 148. The controller 148 may generate an input signal to the coil 156 in response to the speed signal.

The fluid-coupling device 9 may also include a check valve 210 disposed at the outer end 212 of the fill channel 110. The check valve 210 may be in the form of a spring-ball valve and have a default position, wherein the ball 214 of the valve 210 blocks the working chamber inlet port 118. As the output-coupling assembly 13 rotates the check valve 210 opens. The rotational forces cause the ball 214 to overcome the bias spring 216. When the output-coupling assembly 13 stops rotating the bias spring 216 pushes the ball 214 over the working chamber inlet port 118. This prevents fluid from draining into the working chamber 33, when the associated vehicle or engine is shutdown. The drainage of fluid into the working chamber 33 can cause an undesirable engagement of the fluid-coupling device 9 when restarted. For electrically controlled fan drives, a controller, such as the controller 148, holds the check valve 210 closed long enough during engine shutdowns to allow the fluid-coupling device 9 to stop spinning. As such, the controller 148 may be electrically coupled to the check valve 210.

Figure 6:
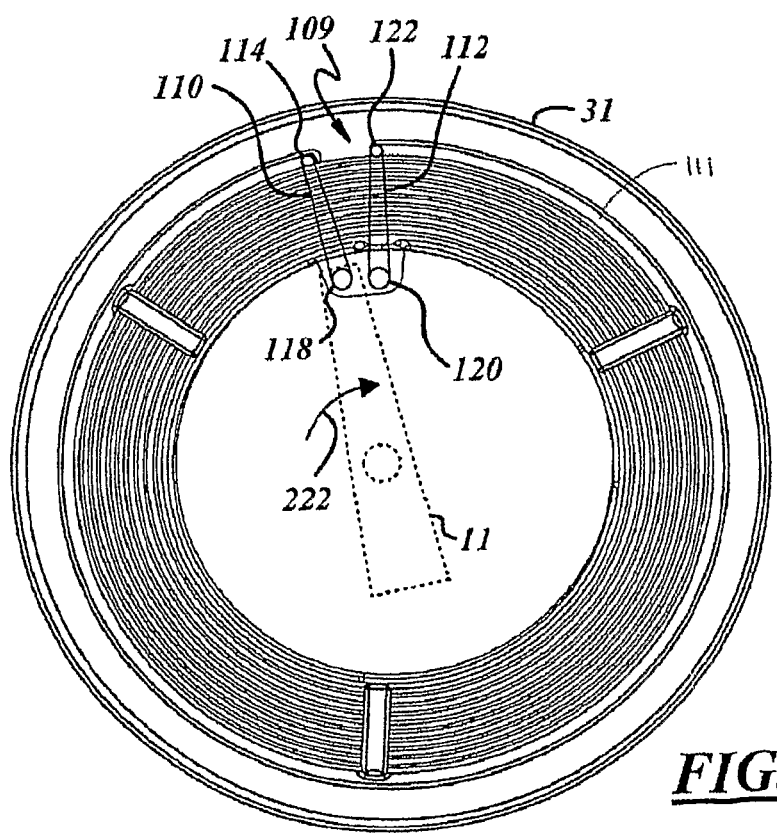
FIG. 6 is a working chamber view of the cover member of FIG. 2 illustrating the valve arm in a no power state and non-failsafe configuration.

Referring now to FIGS. 5 and 6, back views of the cover member 31 are shown illustrating the valve arm in a "no power" state for a failsafe configuration and in a "no power state" for non-failsafe configuration. In the failsafe configuration, when no torque is applied to the valve arm 11, the valve arm 11 is in a position to cover the scavenge port 120, as shown in FIG. 5. In the non-failsafe configuration, when no torque is applied to the valve arm 11, the valve arm 11 is in a position to cover the fill port 118, as shown in FIG. 6. Arrows 220 and 222, respectively show rotation of the valve arm 11 when rotated relative to the cover member 31.

Figure 7:
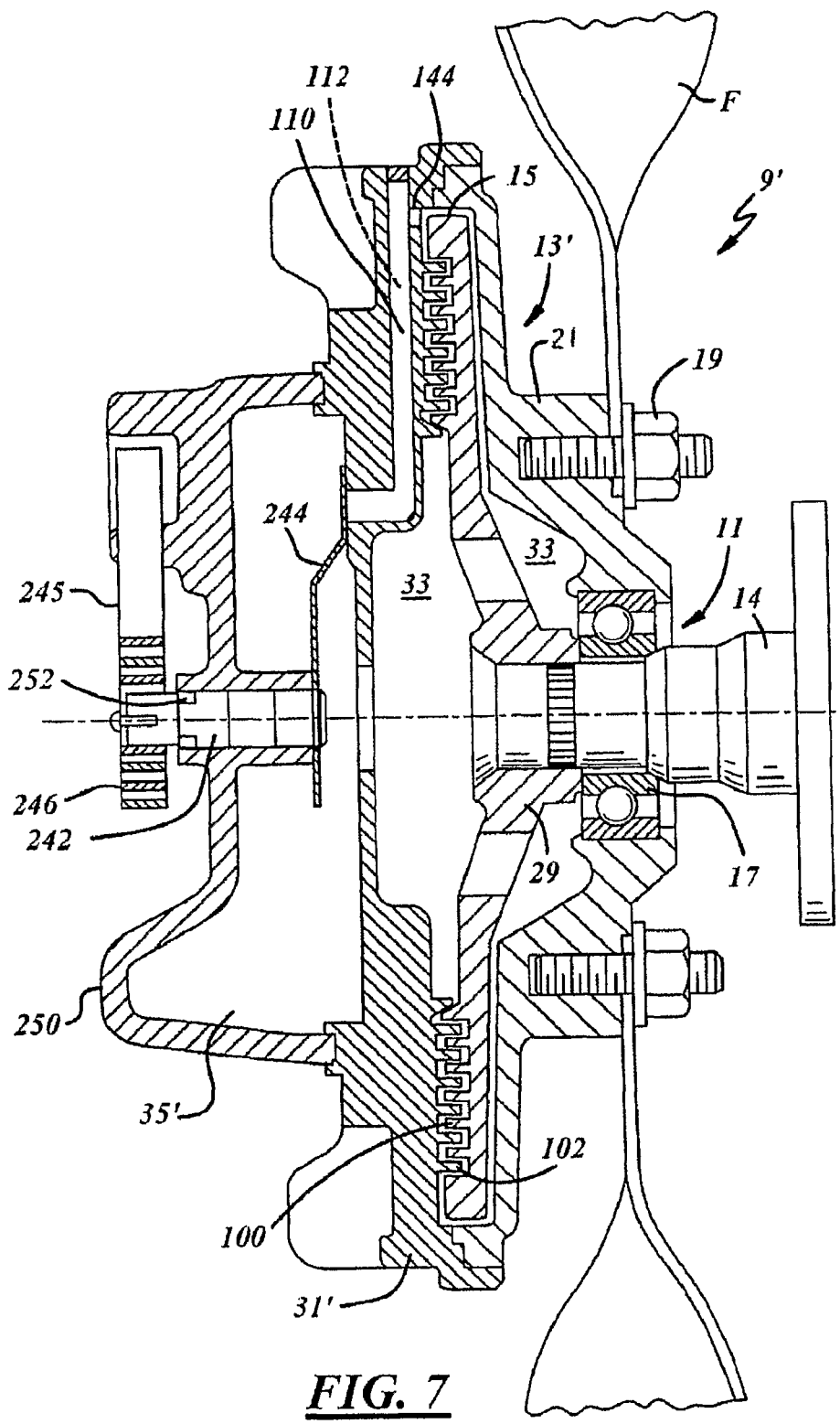
FIG. 7 is an axial cross-section of a viscous fluid-coupling device incorporating a dual-purpose valve that is actuated via a bimetallic control device and in accordance with another embodiment of the present invention.

Referring now to FIG. 7, an axial cross-section of a viscous fluid-coupling device 9' that incorporates a dual-purpose valve or valve arm 244, which is actuated via a bimetallic control device 245 and in accordance with another embodiment of the present invention is shown. The bimetallic control device 245 is used to actuate the valve arm 244, as opposed to an electromagnetic circuit. The bimetallic control device 245 includes a bimetallic control element 246, which may be temperature sensitive. The bimetallic control element 246 may actuate the valve arm 244 in response to only temperature changes, as shown, in response to an electrical signal from a controller, such as the controller 148 above-described, or in response to a combination thereof. In the embodiment shown, the bimetallic control element 246 is coupled to the shaft 248 and is external to the working chamber cover portion 250 of the cover member 31'. As temperature of the control element increases the physical orientation of the control element changes, causing the valve arm to rotate. An o-ring 252 seals the valve shaft 248 to the cover member 250.

The bimetallic control element 246, here shown as a bimetallic coil, senses engine temperature through conduction. As engine temperature increases the bimetallic control element 246 heats up and expands or uncoils, which causes the shaft 248 and valve arm 244 to rotate. This allows an amount of viscous fluid to both enter and exit the working chamber 33 from and to the reservoir chamber 35' and control engagement of the output-coupling assembly 13'. As temperature of the bimetallic control element 246 decreases, it contracts to its original shape, causing the rotation of the valve shaft 248 and valve arm 244 in the opposite direction back to the default position.

As one of ordinary skill in the art recognizes, the threshold engine temperature for expanding and unrolling the bimetallic control element 246 is dependent upon numerous factors. For example, the relative location of the bimetallic control element 246, and fluid-coupling device in general, to an engine block has a significant effect. Further, the composition, thickness, and shape of the bimetallic control element 246 also affect the associated threshold temperature. For example, a thinner element would more readily expand and rotate. Thus, a person of ordinary skill can precisely control relative engagement or disengagement of the fluid-coupling device at a precisely controlled engine temperature.

Moreover, as one of ordinary skill recognizes, the control of the fluid-coupling device may be reversed, wherein the fan drive is maintained in a failsafe "on" position instead of the failsafe "off" position, as disclosed herein.

From the above embodiments of FIGS. 1 and 7, one skilled in the art can recognize that various actuation and activation circuits and systems may be used to control the flow of fluid into and out of the working chamber of a fluid-coupling device. Also, various control valves may be used. Although rotary control valves are shown in FIGS. 1 and 7, other control valves including axial, variable engagement, On/Off valves, and infinitely adjustable control valves may be utilized alternatively or in addition to that shown and described herein.

Figure 8:
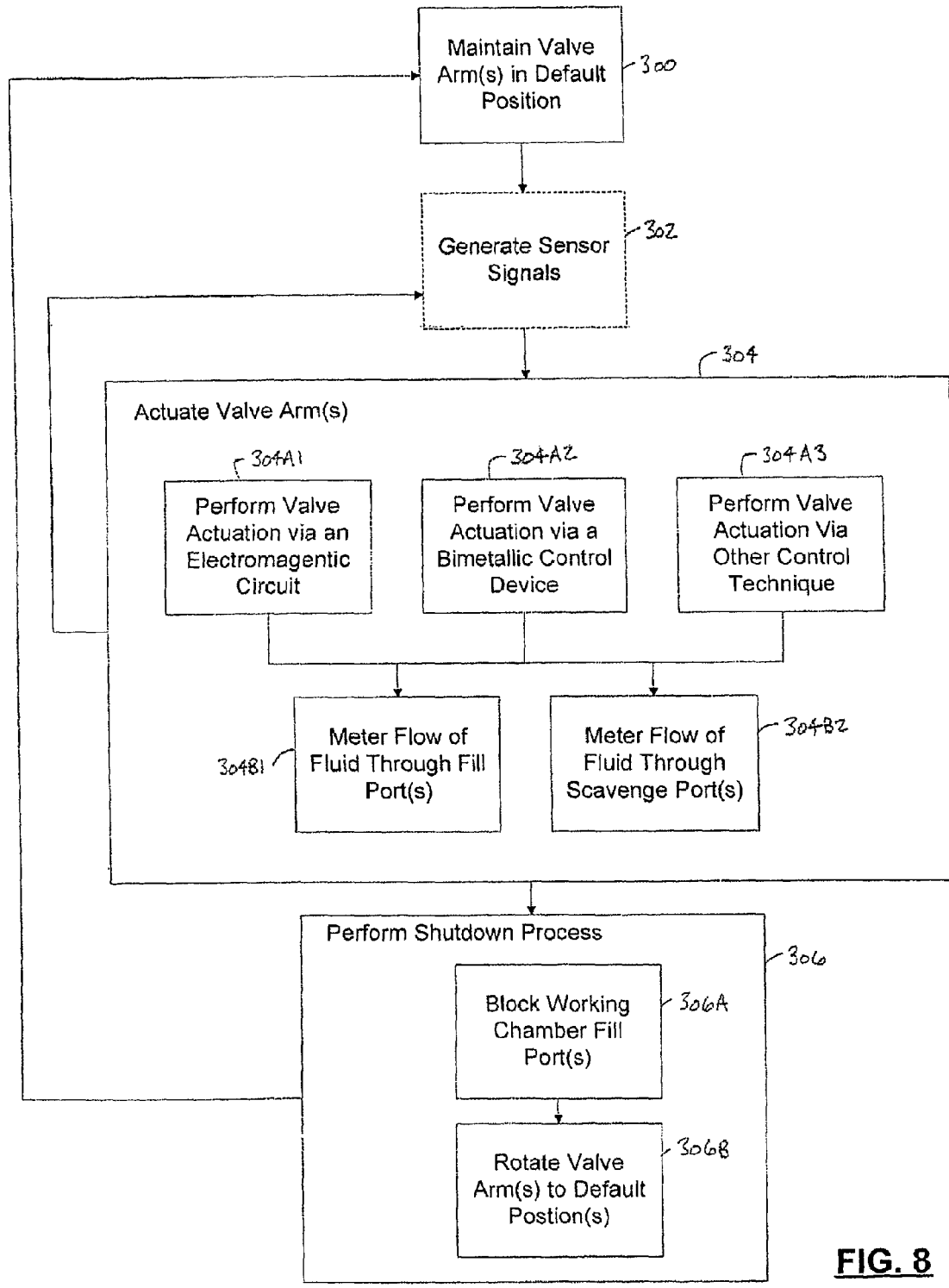
FIG. 8 is a logic flow diagram illustrating a method of controlling the operation of a fluid-coupling device including the engagement thereof.

Referring now to FIG. 8, a logic flow diagram illustrating a method of controlling the operation of a fluid-coupling device, such as one of the fluid-coupling devices 9 or 9', including the engagement thereof is shown.

In step 300, one or more valve arms, such as one of the valve arms 11 and 244, are maintained in a default position until acted upon. In step 302, vehicle, engine, and fluid-coupling device sensors, such as sensors 152 and 200, generate sensor signals that are received by a controller. The controller may, for example, be the controller 148.

In step 304, the controller actuates the valve arm. The controller meters and restricts the amount of fluid flowing to a working chamber, such as the working chamber 35 or 35'. In step 304A1, the actuation is performed using an electromagnetic circuit, such as the electromagnetic circuit 146. The controller generates a control signal in response to the sensor signals, which is passed to an actuation circuit, such as the actuation circuit 140. In step 304A2, the actuation is performed using a bimetallic control device, such as the bimetallic control device 245 or the like. The valve arm may be actuated in response solely to temperature change or in response to a control signal received from the controller. In step 304A3, the actuation is performed using some other control technique known in the art, which may utilize the sensor signals.

In step 304B1, the metering of the fluid is controlled through the covering or uncovering of one or more fill ports, such as the fill port 114. Depending upon the default configuration of the fluid-coupling device, this may cause an increase or restrict the flow of fluid to and from a working chamber. For example, when the default position of an associated valve arm is over a fill port, movement of the valve arm increases fluid flow. On the other hand, when the default position of an associated valve arm is over a scavenge port, movement of the valve arm restricts fluid flow to the working chamber.

In step 304B2, the metering of the fluid is controlled through the covering or uncovering of one or more scavenge ports, such as the scavenge port 122. Likewise, this may also cause an increase or decrease in fluid flow to and from the working chamber. Depending upon the fluid-coupling device configuration, the metering of fluid flow to and from the working chamber may be performed through solely controlling the opening size of a scavenge port. In such a configuration the scavenge circuit is deemed more dominant than the fill circuit.

In step 306, the controller initiates and performs a shutdown process. This may occur when fluid-coupling engagement is no longer desired, prior to or when an engine is shutdown, when cooling is no longer desired, or when some other appropriate condition exists. In step 306A, the working chamber inlet port, such as the working chamber inlet port 118 is blocked. This blockage may be due to the result of a check valve, such as the check valve 210. In step 306B, the valve arm is rotated to a default position.

The above-described steps are meant to be illustrative examples only; the steps may be performed sequentially, synchronously, simultaneously, or in a different order depending upon the application.

The present invention enables the use of a scavenge system or scavenge control, as opposed to fill during fluid-coupling modulation. Higher scavenge capacity provides improved working chamber pumpout times. Also, the ability to control the scavenge rate in combination with outer perimeter filling of a working chamber improves modulation stability and robustness. In support thereof, lag is minimized between torque generation and a valve control command signal.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. A fluid-coupling device comprising:
a housing having a central axis;
a rotor member positioned in said housing and rotatable about said central axis;
a working chamber disposed between and at least partially defined by said housing and said rotor member;
said housing having a first set of annular lands and channels;
said rotor member having a second set of annular lands and channels;
said first and second sets of annular lands and channels interdigited with each other and positioned adjacent the outer peripheries of said rotor member and housing;
said interdigitized first and second sets of annular lands and channels positioned in said working chamber;
a fluid reservoir in said housing;
at least one fill port for passage of a fluid from said fluid reservoir to said working chamber;
at least one scavenge channel having a scavenge port for passage of a fluid from said working chamber to said fluid reservoir;
said at least one inlet port and said at least one scavenge port being positioned adjacent one another in said housing and adjacent said first and second sets of annular lands and channels at a first distance from said central axis; and
a valve member rotatable to a first position to prevent flow through said fill port, to a second position to prevent flow through said scavenge port, and to a third position to allow partial flow through said fill port and/or said scavenge port;
wherein the volume of flow passage created by said at least one scavenge channel is greater than the volume of flow passage from said at least one fill port to said working chamber;
wherein filling of the working chamber with fluid and emptying of the working chamber of fluid are enhanced in a faster manner.

2. The fluid-coupling device as described in claim 1 wherein said valve member is biased to a default position preventing passage of fluid from said fluid reservoir to said working chamber.

3. The fluid-coupling device as described in claim 1 wherein said valve member is biased to a default position allowing passage of fluid from said fluid reservoir to said working chamber.

4. The fluid-coupling device as described in claim 1 wherein said scavenge channel has its inlet end at the radially outer end of said working chamber.

5. The fluid-coupling device as described in claim 4 further comprising a check valve mechanism positioned at said inlet end of said scavenge channel, wherein drain back of fluid from said working chamber to said fluid reservoir is prevented when the fluid coupling device is shut down.

6. The fluid-coupling device as described in claim 5 wherein said check valve mechanism comprises a spring ball assembly.

7. The fluid-coupling device as described in claim 4 wherein said scavenge channel extends between a working chamber outlet port proximate the outer perimeter of said housing and said scavenge port positioned on an inner perimeter of said working chamber.

8. The fluid-coupling device as described in claim 5 wherein said check valve mechanism opens when said housing rotates.

9. The fluid-coupling device as described in claim 1 wherein the rotation of said valve member allows an infinite number of third positions and controls the speed of rotation of said housing and rotor.

10. The fluid-coupling device as described in claim 1 further comprising a fan member attached to said housing and rotatable therewith.

11. The fluid-coupling device as described in claim 1 wherein rotation of said valve member is electromagnetically actuated.

12. The fluid-coupling device as described in claim 1 wherein rotation of said valve is electronically actuated.

13. The fluid-coupling device as described in claim 1 wherein rotation of said valve is actuated by a bimetallic coil.

14. The fluid-coupling device as described in claim 1 wherein said at least one fill port and said at least one scavenge port are proximate each other in a designated control section of said housing.

15. A fluid-coupling device comprising:
a housing having a central axis;
a rotor member positioned in said housing and rotatable about said central axis;
a working chamber disposed between and at least partially defined by said housing and said rotor member;

said housing having a first set of annular lands and channels;
said rotor member having a second set of annular lands and channels;
said first and second sets of annular lands and channels interdigited with each other and positioned adjacent the outer peripheries of said rotor member and housing;
said interdigitized first and second sets of annular lands and channels positioned in said working chamber;
a fluid reservoir in said housing;
at least one fill port for passage of a fluid from said fluid reservoir to said working chamber;
a scavenge channel having a scavenge port for passage of a fluid from said working chamber to said fluid reservoir;
said at least one inlet port and said at least one scavenge port being positioned adjacent one another in said housing and adjacent said first and second sets of annular lands and channels at a first distance from said central axis; and
a valve member rotatable to a first position to prevent flow through said fill port, to a second position to prevent flow through said scavenge port, and to a third position to allow partial flow through said fill port and/or said scavenge port;
wherein said scavenge channel extends between a working chamber outlet port proximate the outer perimeter of said housing and said scavenge port positioned on an inner perimeter of said working chamber;
wherein filling of the working chamber with fluid and emptying of the working chamber of fluid are enhanced in a faster manner.

16. A fluid-coupling device comprising:
a housing having a central axis;
a rotor member positioned in said housing and rotatable about said central axis;
a working chamber disposed between and at least partially defined by said housing and said rotor member;
said housing having a first set of annular lands and channels;
said rotor member having a second set of annular lands and channels;
said first and second sets of annular lands and channels interdigited with each other and positioned adjacent the outer peripheries of said rotor member and housing;
said interdigitized first and second sets of annular lands and channels positioned in said working chamber;
a fluid reservoir in said housing;
at least one fill port for passage of a fluid from said fluid reservoir to said working chamber;
a scavenge channel having a scavenge port for passage of a fluid from said working chamber to said fluid reservoir;
said at least one inlet port and said at least one scavenge port being positioned adjacent one another in said housing and adjacent said first and second sets of annular lands and channels at a first distance from said central axis;
a valve member rotatable to a first position to prevent flow through said fill port, to a second position to prevent flow through said scavenge port, and to a third position to allow partial flow through said fill port and/or said scavenge port; and
a check valve mechanism positioned at said inlet end of said scavenge channel, wherein drain back of fluid from said working chamber to said fluid reservoir is prevented when the fluid coupling device is shut down;
wherein filling of the working chamber with fluid and emptying of the working chamber of fluid are enhanced in a faster manner.

17. The fluid-coupling device as described in claim 16 wherein said scavenge channel has its inlet end at the radially outer end of said working chamber.

18. The fluid-coupling device as described in claim 17 wherein the volume of flow passage created by said at least one scavenge channel is greater than the volume of flow passage from said at least one fill port to said working chamber.

19. The fluid-coupling device as described in claim 16 wherein said check valve mechanism comprises a spring ball assembly.

20. The fluid-coupling device as described in claim 16 wherein the rotation of said valve member allows an indefinite number of third positions and controls the speed of rotation of said housing and rotor.

21. A fluid-coupling device comprising:
a housing having a central axis;
a rotor member positioned in said housing and rotatable about said central axis;
a working chamber disposed between and at least partially defined by said housing and said rotor member;
said housing having a first set of annular lands and channels;
said rotor member having a second set of annular lands and channels;
said first and second sets of annular lands and channels interdigited with each other and positioned adjacent the outer peripheries of said rotor member and housing;
said interdigitized first and second sets of annular lands and channels positioned in said working chamber;
a fluid reservoir in said housing;
at least one fill port for passage of a fluid from said fluid reservoir to said working chamber;
at least one scavenge channel having a scavenge port for passage of a fluid from said working chamber to said fluid reservoir;
said scavenge channel having its inlet end at the radially outer end of the working chamber;
said at least one inlet port and said at least one scavenge port being positioned adjacent one another in said housing and adjacent said first and second sets of annular lands and channels at a first distance from said central axis; and
a valve member rotatable to a first position to prevent flow through said fill port, to a second position to prevent flow through said scavenge port, and to a third position to allow partial flow through said fill port and/or said scavenge port;
wherein the volume of flow passage created by said at least one scavenge channel is greater than the volume of flow passage from said at least one fill port to said working chamber;
wherein filling of the working chamber with fluid and emptying of the working chamber of fluid are enhanced in a faster manner.

22. The fluid-coupling device as described in claim 4 wherein said scavenge channel extends between a working chamber outlet port proximate the outer perimeter of said housing and said scavenge port positioned on an inner perimeter of said working chamber.

23. A fluid-coupling device comprising:
a housing having a central axis;
a rotor member positioned in said housing and rotatable about said central axis;

a working chamber disposed between and at least partially defined by said housing and said rotor member;

said housing having a first set of annular lands and channels;

said rotor member having a second set of annular lands and channels;

said first and second sets of annular lands and channels interdigited with each other and positioned adjacent the outer peripheries of said rotor member and housing;

said interdigitized first and second sets of annular lands and channels positioned in said working chamber;

a fluid reservoir in said housing;

at least one fill port for passage of a fluid from said fluid reservoir to said working chamber;

at least one scavenge port for passage of a fluid from said working chamber to said fluid reservoir;

a scavenge channel for passage of fluid from said working chamber to said fluid reservoir, said scavenge channel having its inlet end at the radially outer end of said working chamber;

said at least one inlet port and said at least one scavenge port being positioned adjacent one another in said housing and adjacent said first and second sets of annular lands and channels at a first distance from said central axis; and a valve member rotatable to a first position to prevent flow through said fill port, to a second position to prevent flow through said scavenge port, and to a third position to allow partial flow through said fill port and/or said scavenge port;

wherein the volume of flow passage created by said at least one scavenge channel is greater than the volume of flow passage from said at least one fill port to said working chamber;

wherein filling of the working chamber with fluid and emptying of the working chamber of fluid are enhanced in a faster manner.

* * * * *